United States Patent Office 3,005,769
Patented Oct. 24, 1961

3,005,769
METHOD OF FRACTIONATING ASPHALTIC BITUMINOUS MATERIAL UTILIZING A SOLVENT-DENSITY-INCREASING SUBSTANCE
Leo Garwin, Oklahoma City, Okla., assignor to Kerr-McGee Oil Industries, Inc., a corporation of Delaware
No Drawing. Filed May 12, 1958, Ser. No. 734,399
14 Claims. (Cl. 208—45)

This invention relates to a process for treating asphaltic bituminous materials with a mixed solvent to separate, as a fluid phase, a high softening point fraction consisting essentially of asphaltenes and/or resins. More particularly, this invention provides a method for separating asphaltenes, as a fluid phase, from an asphaltic bituminous material with a mixed solvent, and then, if desired, further treating said residual asphaltic bituminous material (hereinafter called petrolenes) to obtain a resin and an oil fraction.

The use of hydrocarbons selected from the class consisting of the normally gaseous hydrocarbons having 3 to 4 carbon atoms as a solvent to treat asphaltic bituminous materials to separate relatively soft asphalts having an ASTM ring and ball softening point of 100 to 150° F. has been widely practiced commercially since about 1930. When it was attempted to produce higher softening point asphalts, i.e., about about 200° F., in plants of the propane and butane deasphalting type, trouble with tower plugging caused by asphaltene separation was frequently experienced. The art has taught the use of a multiple solvent treating process to avoid the aforesaid tower plugging difficulties during the production of asphaltenes, if it can actually be said that the prior art has taught anything in regard to continuous asphaltene separation.

In conventional propane or butane treatment to produce asphalt, there are four primary variables which may be changed to affect the yield and the softening point of the resulting asphalt. For example, the temperature, the pressure and/or the solvent to asphaltic bituminous material ratio have all been varied to prevent the aforesaid tower-plugging difficulties, but the resulting asphalt obtained as a consequence of these changes has had a relatively low softening point.

The fourth variable—the use of a mixed solvent, consisting of a density-increasing substance and at least one of the normally gaseous hydrocarbons having from 3 to 4 carbon atoms per molecule, has been described in the literature but, to my knowledge, has never been used commercially, since it has offered no real advantages over conventional propane deasphalting. In fact, it has certain inherent disadvantages.

The art relating to this fourth variable teaches that the ratio of the density-increasing substance to the normally gaseous hydrocarbon is not particularly critical. In fact Churchill in U.S. Patent No. 2,116,188 teaches the use of from 10 to 90% of a density-increasing substance in the solvent mixture to separate an oil fraction and possibly an asphalt fraction. Consequently, it was surprising to discover that if certain critical realtionships are maintained between the above mentioned four variables, asphaltenes would separate from asphaltic bituminous materials as a fluid phase, thereby eliminating the tower-plugging difficulties heretofore experienced with propane or butane deasphalting and deasphaltening.

Not only must each of the variables be controlled within certain critical ranges to avoid tower-plugging difficulties, but these variables must be simultaneously coordinated before the desired results are achieved. For example, it is necessary that each volume of asphaltic bituminous material be treated with at least two volumes of the mixed solvent or a satisfactory phase separation will not occur. In fact, the selectivity of the separation process is better when each volume of asphaltic bituminous material is treated with at least four volumes of the mixed solvent. The selectivity continues to improve with increasing solvent to bituminous material ratio, but at a solvent to bituminous material ratio of 10 to 1, the improvement in selectivity may be considered, for all practical purposes, no longer to be a factor. This does not mean that a solvent to bituminous material ratio greater than 10 to 1 cannot be used.

In addition to the above limitation on the bitumen to solvent ratio, the solvent must be composed of at least 2 parts of at least one of the normally gaseous hydrocarbons having from 3 to 4 carbon atoms per molecule to each part of the density-increasing substance. Unless the mixed solvent meets this critical limitation, it will be impossible to obtain the necessary solvent density to effect the separation of the asphaltenes as a fluid phase without reaching temperatures conducive to cracking.

Accordingly, at those solvent to bitumen ratios within the critical range and with the requisite solvent mixture, asphaltenes of at least 290° F. softening point may be separated as a fluid phase from asphaltic bituminous material at an elevated temperature and pressure provided the temperature is at least about 200° F. and the pressure is adjusted to give the solvent a density of at least 0.43 g./ml. and less than the density of the solvent at which complete miscibility of the solvent and bituminous material occurs. Normally, the density of the solvent at which complete miscibility of the solvent and the bituminous material occurs is in excess of the value 0.48 g./ml., or roughly 0.50 to 0.53 g./ml., depending on the particular characteristics of said solvent and the bituminous material being treated.

The solvents useful in this invention are composed of at least one of the normally gaseous hydrocarbons having from 3 to 4 carbon atoms per molecule, such as propane, propylene, isobutane, and butane. The other component of the solvent or solvent mixture is a density-increasing substance. The density-increasing substances of this invention are those liquid organic compounds boiling below 300° F. and having a density at 60° F. of at least 0.72 g./ml. and preferably less than 0.9 g./ml. Among the substances having the above characteristics are the petroleum distillates, nonane, decane, cyclopentane, cyclohexane, methyl cyclohexane, methyl cyclopentane, benzene, toluene, xylene, etc. The preferred density-increasing substances are the cyclic hydrocarbons, for example, benzene, toluene, xylene, cyclopentane, cyclohexane and methyl cyclopentane.

In this specification and the claims, the term "asphaltic bituminous materials" is intended to include both the pyrogenous bitumens and the native bitumens. Examples of the more common pyrogenous bitumens are reduced crude of either the vacuum or steam reduced types, propane- or butane-precipitated asphalts, cracked tars, wood derived tars and related products, coal tars, etc. The native bitumens include gilsonite, wurtzilite, grahamite, native asphalts (Trinidad), etc. Some of the heavy asphaltic crudes having an API gravity less than about 15 are included within the term "asphaltic bituminous material."

As stated above, asphaltenes are separated from an asphaltic bituminous material, for example, a reduced crude or gilsonite, in a fluid phase by treating each volume of the gilsonite, for instance, with at least two volumes of a solvent which is composed of one part of a density-increasing substance to at least two parts of at least one of the normally gaseous hydrocarbons having from 3 to 4 carbon atoms per molecule at a temperature of at least about 200° F. and at a pressure sufficient to obtain a density for the solvent of at least 0.43 g./ml. and less than that density value represented by complete miscibility of the solvent with the bitumen. Not only are the asphaltenes obtained as a fluid phase by my process but their yield may be varied to obtain an optimum value.

Once the asphaltenes are removed from the pressure vessel, the petrolene-solvent solution may be further treated to effect a further fractionation of the asphaltic bituminous material into resins and oils. For example, this further fractionation is accomplished by adjusting the temperature-pressure relationship to obtain a density for the solvent of between 0.40 and 0.25 g./ml., while maintaining the temperature at least as high as the paracritical temperature of the major component of the solvent. Under such conditions, the solvent separates the petrolenes into two fluid phases—an oil fraction and a resin fraction.

Since unblown heavy asphaltic bitumen fractions having a softening point of at least 180° F. form naphtha solutions which are non-gelling in nature and which show only a slight increase in viscosity on standing, they are preferred for some purposes to the blown asphalts having corresponding softening points. In addition to this difference between the high softening point blown and solvent precipitated asphalts, the solvent precipitated asphalts of at least 180° F. softening point give discrete particles on grinding but the blown asphalts give particles which agglomerate. Thus, solvent precipitated asphalts, which are grindable at 75° F., are preferred over the blown asphalts for certain uses. If it is desired to produce such fractions with a softening point of at least 180° F. from asphaltic bituminous materials, it is only necessary to adjust the pressure-temperature relationship of the treating system to give the solvent a density value of about 0.35 to 0.40 g./ml. instead of a density value of at least 0.43 g./ml. required to separate asphaltenes having a softening point of at least 290° F. The heavy fraction separating at a density value of 0.35 to 0.40 g./ml. will contain all the asphaltenes plus at least part of the resins. Therefore, this heavy fraction will have a softening point less than 290° F., the minimum softening point for asphaltenes.

Specifically, the production of a heavy fraction having a softening point of at least 180° F. is accomplished by treating a reduced crude with a solvent consisting of one part of a cyclic hydrocarbon and five parts of propane at a temperature in excess of about 200° F. and at a pressure sufficient to achieve a solvent density ranging from 0.35 g./ml. to 0.40 g./ml. to thereby separate the heavy fraction as a fluid phase.

The nature of my invention is further illustrated and described in the following examples.

*Example I*

The mixed solvent used in this example consisted of two parts of propane and one part of benzene. Twelve volumes of this solvent was added to each volume of asphalt (ASTM pen at 77° F. of 85–100) charged to the pressure vessel. Under the precent fill conditions existing in this pressure vessel the pressure registered 390 p.s.i.g. at a temperature of 202° F. and the solvent density at these temperature and pressure conditions was 0.48 g./ml. A heavy fraction separated under these conditions and it was withdrawn from the vessel as a fluid phase. Although the heavy fraction existed as a fluid phase within the vessel, it is interesting to note that the softening point of the solvent-free fraction was in excess of about 400° F. or nearly 200° F. higher than the prevailing temperature at which the withdrawal occurred.

The yield of this extremely high softening point heavy fraction was less than 5% by weight.

*Example II*

The mixed solvent used in this example consisted of 3.34 parts of commercial propane to 1 part of benzene, and the asphalt was from the same batch as that used in Example I.

The pressure vessel was charged continuously with one volume of asphalt to 13 volumes of solvent through a mixing line. The temperature of the intimately contacted mixture was maintained at 200° F. and the pressure was adjusted to 430 p.s.i.g. At these conditions, the solvent had a density value of 0.43 g./ml. Under these conditions the heavy fraction separated as a fluid phase. The heavy phase was continuously withdrawn from the bottom of the vessel without any difficulty and the light phase was removed continuously from the top of the pressure vessel. The solvent was removed from the fractions by distillation. The solvent-free heavy fraction had a softening point of 291° F. and was obtained in about 30% yield. It is interesting to note that the softening point of this asphaltene fraction, which extruded from the pressure vessel as a fluid phase, was nearly a hundred degrees higher than the vessel equilibrium temperature.

*Example III*

The experiment of Example II was repeated, except that a petroleum aromatic distillate, having characteristics essentialy the same as those of benzene containing some toluene, was used in place of the benzene.

The asphaltenes separated as a fluid phase and were obtained in satisfactory yield.

*Example IV*

The petrolene-solvent solution leaving the top of the vessel in Example II was given a further treatment to separate the petrolenes (softening point 90–100° F.) into resins and oils. To accomplish this, the temperature-pressure relationship was adjusted to obtain a density for the solvent less than 0.40 g./ml. and greater than 0.35 g./ml. The temperature was at least as high as the paracritical temperature of propane. The resulting phases were separated, and each fraction was subjected to vacuum distillation to remove the solvent. The resins were a black friable material and the oil had the bright color and appearance of a solvent bright stock having a Saybolt Universal viscosity @ 210° of 250 to 500 seconds.

*Example V*

The pressure vessel was charged with one volume of propane-precipitated asphalt of 85–100 penetration and 13 volumes of a mixed solvent. The mixed solvent consisted of 5 parts of commercial butane and 1 part of benzene. The temperature of the system was raised to 202° F. and a pressure of 230 p.s.i.g. was obtained as a consequence of the percent-fill conditions existing within the pressure vessel. The solvent had a density of 0.53 g./ml. at this temperature and pressure. Since the density of the solvent was so near the value where complete miscibility of the asphalt and solvent occurs, only a trace of extremely high softening point asphaltenes separated.

When the experiment was repeated, with the temperature and pressure adjusted to give a solvent density of 0.46 g./ml., it was found that the yield of the asphaltenes increased and the asphaltene so obtained had a softening point in excess of 300° F.

*Example VI*

The pressure vessel was charged with a vacuum reduced crude or asphalt having a softening point of 110–120° F. Sufficient solvent was added to the vessel to give a solvent to reduced crude ratio of 11 to 1. This solvent was composed of 5 parts of commercial propane to 1 part of benzene. The temperature was raised to 202° F. and the pressure adjusted to 470 p.s.i.g. by controlling the percent-fill of the vessel. Under these conditions, the solvent has a density of 0.40 g./ml. The heavy phase fraction separating in the vessel under these conditions was extruded from the vessel as a fluid phase and the solvent was removed by stripping. The heavy fraction had a softening point of 214° F. A component analysis of said fraction disclosed it to be essentially an asphaltene-resin mixture. The yield of this fraction was 52.1% by weight.

From the foregoing discussion further advantages of my invention may be noted. For example, it is possible, by the addition of a density-increasing substance, to utilize the conventional propane or butane deasphalting plant to continuously separate reduced crude or bituminous material into its components of asphaltenes, resins and oils, since it is not necessary to resort to inordinately high pressures—in excess of 1,500 p.s.i.g.—to achieve the desired separation. Furthermore, most existing commercial propane or butane deasphalting units are not designed for operation at a pressure of 1,500#. Thus, not only does my process permit the separation of bituminous components, but it permits the ready conversion of commercial propane deasphalting plants and the continuous non-plugging operation of said units to produce very high softening point asphalts. Said asphaltic fractions have properties not heretofore obtainable with conventional propane deasphalting units.

What I claim is:

1. A method of separating asphaltic bituminous material including asphaltenes into at least two fractions, which method comprises separating a heavy fraction containing essentially asphaltenes from a lighter solvent fraction containing dissolved residual asphaltic bituminous material by treating in a single treating zone at elevated temperature and pressure each volume of the asphaltic bituminous material with at least two volumes of a solvent consisting essentially of one part of a density increasing substance and at least two parts of normally gaseous hydrocarbon having from three to four, inclusive, carbon atoms per molecule, the temperature of treatment being at least 200° F. and the pressure being at least equal to the vapor pressure of the solvent at the highest temperature present in the treating zone, the temperature and pressure being adjusted to provide an effective solvent density to separate a heavy asphaltene fraction of at least 0.43 g./ml. and less than 0.48 g./ml., the separated heavy asphaltene fraction being in the liquid phase and having a viscosity whereby it is freely flowable from the treating zone, and withdrawing the liquid phase asphaltene fraction from the treating zone.

2. The method of claim 1 wherein the density-increasing substance has a density at 60° F. of at least 0.72 g./ml. and a boiling point less than about 300° F.

3. The method of claim 1 wherein the density-increasing substance is benzene.

4. A method of separating an asphaltic bituminous material including asphaltenes into at least two fractions, which method comprises separating a heavy fraction containing essentially asphaltenes from a lighter solvent fraction containing dissolved residual asphaltic bituminous material by treating in a single treating zone at elevated temperature and pressure each volume of the asphaltic bituminous material with at least four volumes of a solvent consisting essentially of one part of a density increasing substance and at least two parts of hydrocarbon selected from the group consisting of propane, butane and isobutane, the temperature of treatment being at least 200° F. and the pressure being at least equal to the vapor pressure of the solvent at the highest temperature present in the treating zone, the temperature and pressure being adjusted to provide an effective solvent density to separate a heavy asphaltene fraction of at least 0.43 g./ml. and less than 0.48 g./ml., the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least 290° F.

5. A method of separating an asphaltic bituminous material including asphaltenes, resins and oils into at least two fractions, which method comprises separating a heavy fraction containing essentially asphaltenes from a lighter solvent fraction containing dissloved residual asphaltic bituminous material by treating in a single treating zone at elevated temperature and pressure each volume of the asphaltic bituminous material with at least two volumes of a solvent consisting essentially of one part of a density increasing substance and at least two parts of normally gaseous hydrocarbon having from three to four, inclusive, carbon atoms per molecule, the temperature of treatment being at least 200° F. and the pressure being at least equal to the vapor pressure of the solvent at the highest temperature present in the treating zone, the temperature and pressure being adjusted to provide a solvent density of at least 0.43 g./ml. and less than 0.48 g./ml., the separated heavy asphaltene fraction being in the liquid phase and having a viscosity whereby it is freely flowable from the treating zone, withdrawing the liquid phase asphaltene fraction from the treating zone, separating a fraction of residual asphaltic bituminous material from a lighter solvent fraction containing oils by treating in a treating zone under further elevated temperature and pressure conditions, the lighter solvent fraction containing dissolved residual asphaltic bituminous material, the temperature and pressure of this treatment being adjusted to provide a solvent density less than about 0.40 g./ml. and greater than about 0.25 g./ml., the separated fraction of residual asphaltic bituminous material being in the liquid phase and having a viscosity whereby it is freely flowable from the treating zone, and withdrawing the liquid phase fraction of residual asphaltic bituminous material from the treating zone.

6. The method of claim 5 wherein the density increasing substance has a density at 60° F. of at least 0.72 g./ml. and a boiling point less than 300° F.

7. The method of claim 5 wherein the density increasing substance is benzene.

8. A method of separating an asphaltic bituminous material including asphaltenes, resins and oils into at least two fractions, which method comprises separating a heavy fraction containing essentially asphaltenes from a lighter solvent fraction containing dissolved residual asphaltic bituminous material by treating in a single treating zone at elevated temperature and pressure each volume of the asphaltic bituminous material with at least four volumes of a solvent consisting essentially of one part of a density increasing substance and at least two parts of normally gaseous hydrocarbon having from three to four, inclusive, carbon atoms per molecule, the temperature of treatment being at least 200° F. and the pressure being at least equal to the vapor pressure of the solvent at the highest temperature present in the treating zone, the temperature and pressure being adjusted to provide a solvent density of at least 0.43 g./ml. and less than 0.48 g./ml., the separated heavy asphaltene fraction being in the liquid phase and having a viscosity whereby it is freely flowable from the treating zone, withdrawing the liquid phase asphaltene fraction from the treating zone, the withdrawn asphaltene fraction having a softening point of at least 290° F., separating a fraction of residual asphaltic bituminous material from a lighter solvent fraction containing oils by treating in a treating zone under further elevated temperature and pressure conditions the lighter solvent fraction containing dissolved residual asphaltic bituminous material, the temperature and pressure of this treatment being adjusted to provide a solvent density less than 0.40 g./ml. and greater than 0.25 g./ml., the separated fraction of residual asphaltic bituminous material being in the liquid phase and having a viscosity whereby it is freely flowable from the treating zone, and withdrawing the liquid phase fraction of residual asphaltic bituminous material from the treating zone.

9. A method of separating asphaltic bituminous material including asphaltenes, resins and oils into at least two fractions, which method comprises separating a heavy fraction containing essentially asphaltenes and resins subsubstantially free of asphaltic oils from a lighter solvent fraction containing dissolved residual asphaltic bituminous material including oils by treating in a single treating zone at elevated temperature and pressure each volume of the asphaltic bituminous material with at least two volumes of a solvent which consists essentially of one part of a density increasing substance and at least two parts of hydrocarbon having from three to four, inclusive, carbon atoms per molecule, the temperature of treatment being at least 200° F. and the pressure being at least equal to the vapor pressure of the solvent at the highest temperature present in the treating zone, the temperature and pressure being adjusted to provide a solvent density of at least 0.43 g./ml. and less than 0.48 g./ml., the separated substantially asphaltic oil-free asphaltene-resin fraction being in the liquid phase and having a viscosity whereby it is freely flowable from the treating zone, and withdrawing the liquid phase asphaltene-resin fraction from the treating zone.

10. The method of claim 9 wherein the density-increasing substance has a density of at leat 0.72 g./ml. at 60° F. and a boiling point less than 300° F.

11. The method of claim 9 wherein the density-increasing substance is benzene.

12. A method of separating asphaltic bituminous material including asphaltenes, resins and oils into at least two fractions, which method comprises separating a heavy fraction containing essentially asphaltenes and resins substantially free of asphaltic oils from a lighter solvent fraction containing dissolved residual asphaltic bituminous material including oils by treating in a single treating zone at elevated temperature and pressure each volume of the asphaltic bituminous material with at least four volumes of a solvent which consists essentially of a density increasing substance and at least two parts of hydrocarbon selected from the group consisting of propane, butane and isobutane, the temperature of treatment being at least 200° F. and the pressure being at least equal to the vapor pressure at the highest temperature present in the treating zone, the temperature and pressure being adjusted to provide a solvent density of at least 0.43 g./ml. and less than 0.48 g./ml., the separated substantially asphaltic oil-free asphaltene-resin fraction being in the liquid phase and having a viscosity whereby it is freely flowable from the treating zone, and withdrawing the liquid phase asphaltene-resin fraction from the treating zone, the asphaltene-resin fraction having a softening point of at least 180° F.

13. The method of claim 12 wherein the density-increasing substance has a density at 60° F. of at least 0.72 g./ml. and a boiling point less than 300° F.

14. The method of claim 12 wherein the density-increasing substance is benzene.

References Cited in the file of this patent

UNITED STATES PATENTS

| | | |
|---|---|---|
| 2,116,188 | Churchill | May 3, 1938 |
| 2,131,205 | Wells | Sept. 27, 1938 |
| 2,200,484 | Batchelder | May 14, 1940 |
| 2,276,155 | Carr | Mar. 10, 1942 |
| 2,337,448 | Carr | Dec. 21, 1943 |
| 2,690,420 | Mack | Sept. 28, 1954 |

FOREIGN PATENTS

| | | |
|---|---|---|
| 708,051 | Great Britain | Apr. 28, 1954 |